UNITED STATES PATENT OFFICE.

JOSEPH B. WILSON, OF FISHERVILLE, NEW JERSEY, ASSIGNOR TO HIMSELF AND JOHN M. MOORE, OF SAME PLACE.

IMPROVED CEMENT FOR SEALING PRESERVE-CANS.

Specification forming part of Letters Patent No. 41,823, dated March 1, 1864.

*To all whom it may concern:*

Be it known that I, J. B. WILSON, of Fisherville, Gloucester county, New Jersey, have invented a Cement for Sealing Preserving-Vessels, &c.; and I do hereby declare the following to be a full, clear, and exact description of the same.

My improved cement consists of white or red lead and pitch intimately mixed together.

Although any of the pitches known in commerce may be used as an ingredient in the manufacture of my improved cement, I prefer, on the score of economy, the black resinous substance constituting the residuum when the volatile portions of gas-tar are driven off by heat. This pitch having been melted in a suitable caldron, I take common white lead of commerce—such as is sold to painters and others—and intimately mix it with the molten pitch, the quantity of white lead being from one-fifteenth to one-twentieth of that of the pitch. The proportions, however, may be varied without departing from the main features of my invention. In place of the white lead, the same quantity of red lead may be used. After the pitch and lead have been thoroughly mixed the compound is poured into molds, so as to form sticks or slabs, ready for being used for the sealing of preserving-vessels. Pitch of itself has but little tendency to adhere to the glass portions of these vessels; but a cement formed of pitch and white lead adheres to the glass with the desired tenacity.

I claim as my invention and desire to secure by Letters Patent—

A sealing-cement composed of the ingredients and in the manner described.

In testimony whereof I have signed my name to this specification in the presence of two subscribing witnesses.

JOSEPH B. WILSON.

Witnesses:
   HENRY HOWSON,
   CHARLES HOWSON.